(12) United States Patent
Yang et al.

(10) Patent No.: US 9,249,348 B2
(45) Date of Patent: *Feb. 2, 2016

(54) HEAT TRANSFER SYSTEM ADDITIVE PACKAGE

(71) Applicant: Prestone Products Corporation, Lake Forest, IL (US)

(72) Inventors: Bo Yang, Ridgefield, CT (US); Peter M. Woyciesjes, Woodbury, CT (US); Aleksei V. Gershun, Southbury, CT (US); Filipe J. Marinho, Danbury, CT (US)

(73) Assignee: Prestone Products Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,207

(22) Filed: Apr. 2, 2014

(65) Prior Publication Data

US 2014/0225025 A1 Aug. 14, 2014

Related U.S. Application Data (63) Continuation of application No. 12/396,758, filed on Mar. 3, 2009, now Pat. No. 8,696,927.

(60) Provisional application No. 61/033,186, filed on Mar. 3, 2008.

(51) Int. Cl.
*C09K 5/20* (2006.01)
*C09K 5/10* (2006.01)
*C23F 11/08* (2006.01)
*F28F 19/00* (2006.01)
*F28F 23/00* (2006.01)

(52) U.S. Cl.
CPC ... *C09K 5/20* (2013.01); *C09K 5/10* (2013.01); *C23F 11/08* (2013.01); *F28F 19/00* (2013.01); *F28F 23/00* (2013.01)

(58) Field of Classification Search
CPC .............. C09K 5/20; C09K 5/08; C09K 5/10; C09K 5/14
USPC ......... 252/71, 73, 74, 75, 68, 67; 165/104.19, 165/148; 62/114, DIG. 20
See application file for complete search history.

(56) References Cited

U.S. PATENT DOCUMENTS

| | | | |
|---|---|---|---|
| 3,198,820 A | 8/1965 | Pines et al. | |
| 3,203,969 A | 8/1965 | Pines et al. | |
| 3,248,329 A | 4/1966 | Pines et al. | |
| 3,312,622 A | 4/1967 | Pines et al. | |
| 3,337,496 A | 8/1967 | Pines et al. | |
| 3,341,469 A | 9/1967 | Pines et al. | |
| 3,951,328 A | 4/1976 | Wallace et al. | |
| 3,971,501 A | 7/1976 | Cooke | |
| 4,093,641 A | 6/1978 | Plueddemann | |
| 4,159,034 A | 6/1979 | Bellovary et al. | |
| 4,287,077 A | 9/1981 | Wing | |
| 4,297,775 A | 11/1981 | Butt et al. | |
| 4,333,843 A | 6/1982 | Wing et al. | |
| 4,352,742 A | 10/1982 | Davis et al. | |
| 4,354,002 A | 10/1982 | Davis et al. | |
| 4,362,644 A | 12/1982 | Davis et al. | |
| 4,370,255 A | 1/1983 | Plueddemann | |
| 4,440,721 A | 4/1984 | Wilson et al. | |
| 4,620,590 A | 11/1986 | Koisuka et al. | |
| 4,629,602 A | 12/1986 | Gousetis et al. | |
| 4,701,277 A | 10/1987 | Mohr et al. | |
| 4,772,408 A | 9/1988 | Mohr et al. | |
| 5,292,480 A | 3/1994 | Fischer et al. | |
| 5,460,895 A | 10/1995 | Rungta et al. | |
| 5,925,173 A | 7/1999 | Frost et al. | |
| 6,391,257 B1 | 5/2002 | Woyciesjes | |
| 6,528,468 B2 | 3/2003 | Matsukawa et al. | |
| 6,818,146 B2 | 11/2004 | Eaton et al. | |
| 8,696,927 B2 * | 4/2014 | Yang et al. | ...................... 252/68 |
| 8,771,542 B2 * | 7/2014 | Yang et al. | ...................... 252/79 |
| 2006/0017044 A1 | 1/2006 | Zhang et al. | |
| 2006/0033077 A1 | 2/2006 | Hudgens | |
| 2007/0075120 A1 | 4/2007 | Yang et al. | |
| 2007/0120094 A1 | 5/2007 | Yang et al. | |
| 2009/0294102 A1 * | 12/2009 | Yang et al. | ............... 165/104.19 |

FOREIGN PATENT DOCUMENTS

WO    WO 00/50532    8/2000

OTHER PUBLICATIONS

European Search Report of Appl. No. 09717823.0 dated Sep. 18, 2013.
International Search Report and Written Opinion for PCT/US2009035829 dated Oct. 19, 2009.

* cited by examiner

*Primary Examiner* — Douglas McGinty
(74) *Attorney, Agent, or Firm* — Gregory H. Zayia; Barnes & Thornburg LLP (57) ABSTRACT

Disclosed herein is heat transfer system, comprising a brazed aluminum component, and a heat transfer fluid in fluid communication with the brazed aluminum component, wherein the heat transfer fluid comprises a liquid coolant, an oxyanion of molybdenum, tungsten, vanadium, phosphorus, antimony, or a combination thereof, and a corrosion inhibitor. Also disclosed is a method of preventing corrosion in the heat transfer system, and a heat transfer fluid and additive package for use in the heat transfer system.

23 Claims, 1 Drawing Sheet

HEAT TRANSFER SYSTEM ADDITIVE PACKAGE

CROSS REFERENCE TO RELATED APPLICATIONS

This application is a continuation of U.S. patent application Ser. No. 12/396,758, filed Mar. 3, 2009, now U.S. Pat. No. 8,696,927, which claims the benefit of U.S. Provisional Patent Application Ser. No. 61/033,186 filed Mar. 3, 2008, the entire contents of which are hereby incorporated by reference.

BACKGROUND

The operation of a power source generates heat. A heat transfer system, in communication with the power source, regulates the generated heat by absorbing and dissipating the heat from the power source. A gasoline powered internal combustion engine, for example, powers an automotive vehicle. Heat transfer fluids and systems dissipate the heat generated as a by-product of gasoline combustion, and ensure that the engine operates at an optimum temperature. Heat transfer fluids, which generally comprise water, glycol or glycol-water mixtures, are in communication with one or several metallic parts that are prone to corrosion. Thus, several corrosion inhibitors are added to the heat transfer fluid in order to protect the metallic parts from corrosion.

Aluminum is an example of a metal that, along with its alloys, can be used in the manufacture of several components of the heat transfer system such as heat exchangers which include but are not limited to radiators, condensers, evaporators, heater cores, intercoolers, charge air coolers, oil coolers, and the like. These components can be manufactured using several techniques, one advantageous technique being brazing, wherein the individual components are permanently joined together with a brazing alloy. Generally, brazed heat exchangers are lower in weight and are able to radiate heat better than heat exchangers formed by mechanical expansion.

Controlled atmosphere brazing ("CAB") is a method used by the automotive industry for making brazed aluminum components for a heat transfer system. CAB provides for improved production yields, lower furnace maintenance requirements, greater braze process robustness and lower capital cost of the equipment employed. However, in a CAB process, a fluxing or flux agent is applied to the pre-assembled component surfaces to be jointed. The fluxing agent is used to dissociate or dissolve and displace the aluminum oxide layer that naturally forms on aluminum alloy surfaces. The fluxing agent is also used to prevent reformation of the aluminum oxide layer during brazing and to enhance the flow of the brazing alloy. Fluxing agents generally include halide anions, such as but not limited to, alkaline metal or alkaline earth metal fluorides or chlorides. One non-limiting example of a fluoride based flux is NOCOLOK™. NOCOLOK™ fluxes are widely used in the automotive industry for brazing aluminum and/or aluminum alloy surfaces.

After brazing, the residual flux on aluminum and/or aluminum alloy surfaces can leach out halide ions, such as but not limited to, fluoride ions, as well as other species from flux residue components in different stage of oxidation, such as but not limited to potassium, sodium, aluminum, zinc ions. The leached out halide ions and flux residue components can lead to localized corrosion on the metal substrates when it is in contact with a heat transfer fluid in the heat transfer system. This disadvantageous localized corrosion resulting from the residual flux can occur in the presence of several commercial heat transfer fluids, including but not limited to those based on organic acid technology ("OAT"), or hybrid organic acid and silicate ("HOAT") or traditional inorganic acid-silicates (IAT) based heat transfer fluids.

Therefore, there exists a need to provide heat transfer fluids intended for use in heat transfer systems comprising brazed metals or metal alloys such as brazed aluminum, which provide corrosion protection from residual fluxing agents, specifically from those comprising halide anions, and more specifically from those fluxing agents comprising fluoride anions.

SUMMARY

The above-described and other drawbacks are alleviated by a heat transfer system, comprising a brazed aluminum component and a heat transfer fluid in fluid communication with the brazed aluminum component, wherein the heat transfer fluid comprises a liquid coolant, an oxy-anion of molybdenum, tungsten, vanadium, phosphorus, antimony, or a combination thereof, and a corrosion inhibitor.

Also described herein is a method of preventing corrosion in a heat transfer system. The method comprises contacting the heat transfer system with a heat transfer fluid. The heat transfer system comprises a brazed aluminum component and the heat transfer fluid is in fluid communication with the brazed aluminum component. The heat transfer fluid comprises a liquid coolant, an oxy-anion of molybdenum, tungsten, vanadium, phosphorus, antimony, or a combination thereof, and a corrosion inhibitor.

Also described herein is a heat transfer fluid. The heat transfer fluid, for use in a heat transfer system comprising a brazed aluminum component, comprises a liquid coolant, an oxy-anion of molybdenum, tungsten, vanadium, phosphorus, antimony, or a combination thereof, and a corrosion inhibitor.

Also described herein is an additive package. The additive package, for use in a heat transfer system comprising a brazed aluminum component and another heat transfer fluid, comprises an oxy-anion of molybdenum, tungsten, vanadium, phosphorus, antimony, or a combination thereof, and a corrosion inhibitor.

BRIEF DESCRIPTION OF THE DRAWINGS

Referring now to the drawings wherein.

DETAILED DESCRIPTION

Surprisingly, it has been discovered that in a heat transfer system comprising a brazed aluminum component, and a heat transfer fluid in fluid communication with the brazed aluminum component, a heat transfer fluid comprising a liquid coolant, an oxy-anion of molybdenum, tungsten, vanadium, phosphorus, antimony, or a combination thereof, and a corrosion inhibitor, is effective at reducing and/or eliminating corrosion due to residual fluxes used in brazing the brazed aluminum component.

As used herein, a "brazed aluminum component" refers to a component of the heat transfer system that comprises aluminum and/or an aluminum alloy. The component comprises several individual components that are permanently joined together using brazing, and/or the component is permanently joined to an adjacent component using brazing. In one embodiment, brazing is effected in the presence of a fluxing agent comprising halide anions. In another embodiment, the fluxing agent comprises fluoride and chloride anions. In one exemplary embodiment, the fluxing agent comprises fluoride anions.

The liquid coolant comprises an alcohol, water, or a combination of an alcohol and water. It is advantageous to use deionized water, demineralized water, or deionized and demineralized water, which generally exhibit a conductivity lower than that of water which has not been deionized or demineralized. The heat transfer fluid can be a concentrated heat transfer fluid, that is, a heat transfer fluid comprising a liquid coolant consisting essentially of alcohols. Concentrated heat transfer fluids are advantageous for storage and shipping. Concentrated heat transfer fluids can, if desired, be combined with water prior to use in the heat transfer system. The heat transfer fluid can, on the other hand, be a diluted heat transfer fluid, that is, a heat transfer fluid comprising alcohols and water. Both concentrated and diluted heat transfer fluids are suitable for use in the heat transfer system. In one embodiment, the heat transfer fluid is a concentrated heat transfer fluid. In another embodiment, the heat transfer fluid comprises a diluted heat transfer fluid.

Water can be present in the heat transfer fluid in an amount up to 90 weight percent ("wt %"), based on the total weight of the heat transfer fluid. Specifically, water can be present in the heat transfer fluid in an amount of about 0.1 to about 90 wt %, more specifically 0.5 to about 70 wt %, and more specifically about 1 to about 60 wt %, based on the total weight of the heat transfer fluid. In one exemplary embodiment, water is present in an amount of about 1 to about 40 wt %, based on the total weight of the heat transfer fluid. In another exemplary embodiment, the heat transfer fluid is essentially free of water, that is, comprises about 0 wt % water.

The alcohols suitable for use in the liquid coolant comprise monohydric alcohols, polyhydric alcohols, or mixture of monohydric and polyhydric alcohols. Non-limiting examples of monohydric alcohols include methanol, ethanol, propanol, butanol, furfurol, tetrahydrofurfuryl alcohol, ethoxylated furfuryl alcohol, alkoxy alkanols such as methoxyethanol, and the like, and combinations thereof. Non-limiting examples of polyhydric alcohols include, ethylene glycol, diethylene glycol, triethylene glycol, propylene glycol, 1,2-propylene glycol, 1,3-propylene glycol (or 1,3-propanediol), dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylol propane, and the like, and combinations thereof.

The alcohol can be present in the heat transfer fluid in an amount of about 1 to about 99.9 wt %, based on the total weight of the heat transfer fluid. Specifically, the alcohol can be present in the heat transfer fluid in an amount of about 30 to about 99.5 wt %, and more specifically about 40 to about 99 wt %, based on the total weight of the heat transfer fluid. In one exemplary embodiment, the alcohol is present in amount of 40 to about 99 wt %, based on the total weight of the heat transfer fluid.

Any oxy-anion of molybdenum, tungsten, vanadium, phosphorus, or antimony can be used herein. In one exemplary embodiment, the employed oxy-anion will be at least one of molybdenum, phosphorous, and a combination thereof.

In general, water soluble salts of such oxy-anions can be used. Specific examples include alkali metal, alkaline earth metal, and ammonium salts of molybdates, tungstates, metatungstates, vanadates, metavanadates, ortho phosphates, pyro-phosphates, hexametaphosphates, polyphosphates, phosphoric acid, antimony tartrates, and the like. In one embodiment, illustrative water soluble salts include the alkali metal salts, ammonium salts, or a combination thereof. Non-limiting examples of antimony tartrates include those of the formula $E(SbO)C_4H_4O_6$ and the hydrates $E(SbO)C_4H_4O_6 \cdot xH_2O$, where E is an alkali metal cation, alkaline earth metal cation, or ammonium cation, and x is the amount of hydration, and is not limited to any number, but can generally be 0 to 20, specifically 1 to 10, more specifically 1 to 5, and more specifically 1 to 3, and the like. Other salts thereof, and combinations thereof can also be used. In one embodiment alkali metal and ammonium salts will be used.

Non-limiting examples of oxy-anions suitable for use herein include sodium molybdate, sodium molybdate dihydrate, sodium tungstate, and ammonium metatungstate, such as those available from North Metal & Chemical Company (York, Pa., USA), sodium molybdate and ammonium di-, hepta- or octa-molybdates such as those available from Climax Molybdenum Company (Phoenix, Ariz., USA), potassium or sodium vanadates or metavanadates, sodium molybdate, ammonium metatungstate and ammonium paratungstate such as those available from Alcan Chemicals (Stamford, Conn., USA, a division of Rio Tinto Alcan), potassium or sodium phosphates, such as monosodium or monopotassium phosphate, disodium or dipotassium phosphate, trisodium or tripotassium phosphate, tetrasodium or tetrapotassium pyrophosphate, sodium pyrophosphate, sodium or potassium tripolyphosphate, potassium polyphosphate, sodium hexametaphosphate, and phosphoric acid, polyphosphoric acid, and other phosphates, such as alkali earth phosphates and ammonium phosphates such as those available from Innophos, Inc. (Cranbury, N.J., USA) or ICL Performance Products LP (St. Louis, Mo., USA) and other suppliers, and potassium antimony tartrates (potassium antimonyl tartrates), potassium antimonite, and potassium hexahydroxyantimonate such as those available from Sigma-Aldrich (St. Louis, Mo., USA) or LabChem, Inc. (Pittsburgh, Pa., USA). Similar oxy-anion products from other suppliers can also be used.

While not wishing to be bound by theory, it is believed that the oxy-anions reduce the corrosion of the brazed metal, such as brazed aluminum, by forming a very thin insoluble protective layer on the metal surface. The protective layer can be composed of surface products between the brazed metal and the oxy-anion. For example, in the case of aluminum, one or more Al(III) species can form at the surface, such as aluminum oxide, aluminum hydroxide, aluminum carboxylate, or the like. These species can react with the oxy-anions to form a thin insoluble protective layer on the brazed aluminum surface. Once the aluminum corrosion rate is reduced and all the available reaction sites on the aluminum surface are covered with the protective layer, the formation of additional protective deposits will stop. In other word, the growth of the protective layer is localized and self-limited. Thus, the protective layer will not form beyond the reaction sites of the brazed metal.

The oxy-anion of molybdenum, tungsten, vanadium, phosphorus, antimony, or a combination thereof, can be present in the amount of about 0.01 to about 10 wt %, specifically about 0.1 to about 8 wt %, more specifically about 0.5 to about 4 wt %, based on the total weight of the heat transfer fluid. In one exemplary embodiment, the oxy-anion of molybdenum, tungsten, vanadium, phosphorus, antimony, or a combination thereof, can be present in the amount of about 0.01 to about 5 wt %, based on the total weight of the heat transfer fluid.

In one exemplary embodiment, a combination of an oxy-anion of phosphorus with an oxy-anion selected from an oxy-anion of molybdenum, tungsten, vanadium, antimony and a combination thereof, can be used. A synergistic effect is thus observed between the oxy-anion of phosphorus and the oxy-anion selected from the oxy-anion of molybdenum, tungsten, vanadium, and antimony. The oxy-anion of phosphorus can be used in an amount of about 0.01 to about 3 wt %, specifically about 0.1 to about 2 wt %, and more specifically about 0.2 to about 1 wt %, based on the total weight of the heat transfer fluid, and the combination of oxy-anions of molybdenum, tungsten, vanadium, and antimony can also be used in an amount of about 0.01 to about 3 wt %, specifically about 0.1 to about 2 wt %, and more specifically about 0.2 to about 1 wt %, based on the total weight of the heat transfer fluid.

In one exemplary embodiment, an oxy-anion of phosphorus is used in an amount of about 0.1 to about 1 wt %, based on the total weight of the heat transfer fluid, in combination with an oxy-anion of molybdenum in an amount of about 0.1 to about 1 wt %, based on the total weight of the heat transfer fluid.

In one exemplary embodiment, phosphoric acid, $H_3PO_4$, is used as the oxy-anion of phosphorus, in amount of about 0.1 to about 1 wt %, specifically about 0.2 to about 0.8 wt %, and more specifically about 0.25 to about 0.5 wt %, based on the total weight of the heat transfer fluid, in combination with $MoO_4^{2-}$ as the oxy-anion of molybdenum, in amount of about 0.1 to about 1 wt %, specifically about 0.2 to about 0.8 wt %, and more specifically about 0.25 to about 0.5 wt %, based on the total weight of the heat transfer fluid. Any suitable source can be used as the source of $MoO_4^{2-}$, such as, but not limited to, $Na_2MoO_4$. In one specific exemplary embodiment, $H_3PO_4$ is used in amount of about 0.25 wt %, in combination with $MoO_4^{2-}$ in amount of about 0.25 wt %, based on the total weight of the heat transfer fluid. In another specific exemplary embodiment, $H_3PO_4$ is used in amount of about 0.5 wt %, in combination with $MoO_4^{2-}$ in amount of about 0.5 wt %, based on the total weight of the heat transfer fluid. In another specific exemplary embodiment, $H_3PO_4$ is used in amount of about 0.5 wt %, in combination with $MoO_4^{2-}$ in amount of about 0.25 wt %, based on the total weight of the heat transfer fluid. In another specific exemplary embodiment, $H_3PO_4$ is used in amount of about 0.25 wt %, in combination with $MoO_4^{2-}$ in amount of about 0.5 wt %, based on the total weight of the heat transfer fluid.

There is no particular limitation to the corrosion inhibitors for use herein, and they can comprise azole-based corrosion inhibitors, siloxane-based corrosion inhibitors, colloidal silica, silicates, carboxylates, tall oil fatty acids, borates, nitrates, nitrites, alkali or alkaline earth metal, ammonium or amine salts thereof, or the like, or a combination thereof. More specifically, the corrosion inhibitor can comprise a combination of two or more corrosion inhibitors selected from the group consisting of an azole-based corrosion inhibitor, a siloxane-based corrosion inhibitor, colloidal silica, a silicate, a carboxylate, a tall oil fatty acid, a borate, a nitrate, a nitrite, an alkali or alkaline earth metal salt thereof, an ammonium salt thereof, an amine salt thereof. The amount of corrosion inhibitors can be readily determined by one with ordinary skill in the art, depending on the application and on the corrosion inhibitor. In general, the corrosion inhibitors are present in an amount of about 0.01 to about 10 wt %, specifically about 0.1 to about 8 wt %, more specifically about 0.5 to about 4 wt %, based on the total weight of the heat transfer fluid.

Azole-based corrosion inhibitors are five-membered heterocyclic compounds having 1 to 4 nitrogen atoms as part of the heterocycle. Suitable azole-based corrosion inhibitors comprise pyrroles, pyrazoles, imidazoles, triazoles, thiazoles and tetrazoles according to formulas (I)-(IV):

wherein $R^2$ is a hydrogen atom or a halogen such as Cl or Br, or a $C_1$-$C_{20}$ alkyl group, $R^1$ is a hydrogen atom, a $C_1$-$C_{20}$ alkyl group, or SH or SR group, and X is N, C—SH, C—$SR^1$, C—H, or C—$R^1$; and Y is selected from N, C—$R^1$ or C—H.

Non-limiting examples of azole-based corrosion inhibitors include pyrrole, methylpyrrole, pyrazole, dimethylpyrazole, benzotriazole, tolyltriazole, methyl benzotriazole such as 4-methyl benzotriazole and 5-methyl benzotriazole, butyl benzotriazole, mercaptobenzothiazole, benzimidazole, halobenzotriazole such as chloro-methylbenzotriazole, tetrazole, methyl tetrazole, mercapto tetrazole, thiazole, 2-mercaptobenzothiazole and the like. In one embodiment, the azole compound is benzotriazole, tolyltriazole, mercaptobenzothiazole, or a combination thereof. In one exemplary embodiment, the azole-based corrosion inhibitor is benzotriazole or tolyltriazole.

The azole-based corrosion inhibitors can be present in the heat transfer fluid in an amount up to about 10 wt %, specifically about 0.01 to about 8 wt %, more specifically about 0.05 to about 4 wt %, based on the total weight of the heat transfer fluid.

Colloidal silica useful herein is of an average particle size of about 1 nanometer (nm) to about 200 nm, more specifically from about 1 nm to about 100 nm, and even more specifically from about 1 nm to about 40 nm. The colloidal silica is advantageous as a corrosion inhibitor, and can advantageously improve the heat transfer properties of the heat transfer fluid. Not wishing to be bound by theory, it is believed that the use of silica of a particular average particle size provides improvements in heat transfer efficiency and/or heat capacity by providing a large surface area for contact with the heat transfer fluid.

Non-limiting examples of colloidal silica include LUDOX from DuPont or Grace Davidson, NYACOL or BINDZIL from Akzo Nobel or Eka Chemicals, SNOWTEX from Nissan Chemical. Other suppliers of suitable colloidal silica include Nalco and the like.

The colloidal silica can be present in the heat transfer fluid in an amount of up to about 10,000 ppm as Si, more specifically of about 1 to about 2000 ppm as Si, and even more specifically about 10 to about 600 ppm as Si, based on the total weight of the heat transfer fluid.

Siloxane-based corrosion inhibitors comprise polysiloxanes and organosilane compounds comprising a silicon-carbon bond. Suitable polysiloxanes are those of the formula R$_3$—Si—[O—Si(R)$_2$]$_x$—OSiR$_3$ wherein R is an alkyl group or a polyalkylene oxide copolymer of 1 to 200 carbons and is from 0 to 100. In one exemplary embodiment, at least one R group is a hydrophilic group such as a polyalkylene oxide copolymer of one or more alkylene oxides having from 2 to 6 carbons, specifically from 2 to 4 carbons. Commercially available polysiloxanes for which the structure is unknown or which is outside the scope of this formula can also be used.

Non-limiting examples of commercially available polysiloxanes include the SILWET siloxanes from GE Silicones/OSi Specialties, and other similar siloxane-polyether copolymers available from Dow Corning or other suppliers. In one exemplary embodiment, siloxane-based corrosion inhibitors comprise SILWET L-77, SILWET L-7657, SILWET L-7650, SILWET L-7600, SILWET L-7200, SILWET L-7210 and the like.

Organosilane compounds comprise a silicon-carbon bond capable of hydrolyzing in the presence of water to form a silanol, that is, a compound comprising silicon hydroxide. Organosilane compounds can be of the formula R'Si(OZ)$_3$ wherein Z is an aromatic group, a cycloaliphatic group, an alkyl group, an alkoxy group, or an alkylene group, and can comprise a heteroatom such as N, S, or the like, in the form of functional groups such as amino groups, epoxy groups, or the like. In one embodiment, organosilane compounds are of the general formula Z'Si(OZ)$_3$ wherein Z' can be an aromatic group, a cycloaliphatic group, an alkyl group, an alkoxy group, or an alkylene group, and can comprise a heteroatom such as N, S, or the like, in the form of functional groups such as amino groups, epoxy groups, or the like, and Z is a C$_1$-C$_5$ alkyl group. Organosilane compounds for which the structure is unknown or which is outside the scope of this formula can also be suitable for use as siloxane-based corrosion inhibitors.

Non-limiting examples of commercially available organosilane compounds include the SILQUEST and FORMASIL surfactants from GE Silicones/OSi Specialties, and other suppliers. In an exemplary embodiment, siloxane-based corrosion inhibitors comprise FORMASIL 891, FORMASIL 593, FORMASIL 433, SILQUEST Y-5560 (polyalkyleneoxidealkoxysilane), SILQUEST A-186 (2-(3,4-epoxycyclohexyl)ethyltrimethoxysilane), SILQUEST A-187 (3-glycidoxypropyltrimethoxysilane), or other SILQUEST organosilane compounds available from GE Silicones, Osi Specialties or other suppliers and the like.

Other non-limiting examples of organosilane compounds for use herein include 3-aminopropyltriethoxysilane, N-2-(aminoethyl)-3-aminopropyltrimethoxysilane, octyltriethoxysilane, vinyltriethoxysilane, vinyltrimethoxysilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, and those organosilane compounds having a structure similar to the foregoing, but varying numbers of carbon atoms.

The siloxane-based corrosion inhibitor can be present in the heat transfer fluid in an amount up to about 10 wt %, more specifically about 0.02 to about 2 wt %, based on the total weight of the heat transfer fluid.

Corrosion inhibitors for use herein can also include a silicate present in an amount of from 30 ppm to 2000 ppm in equivalent Si concentration, in combination with a silicate-stabilizing silicone. Non-limiting examples of silicate-stabilizing silicones include Silquest Y-5560 organosilane, sodium (trihydroxysilyl)-propylmethylphosphonate, and organic phosphosilicone compounds (i.e., O$_{1.5}$Si—C$_3$H$_6$—P(O)(O$^-$ Na$^+$)(OC$_2$H$_5$) such as those disclosed in U.S. Pat. No. 4,629,602. In one embodiment, the silicate:silicone ratio is from 20:1 to 1:2 by weight.

Suitable silicates include inorganic silicates and organic silicates. Non-limiting examples of inorganic silicates include those having the formula (MO)$_m$SiO$_{(4-n/2)}$(OH)$_p$ wherein M is a monovalent cation that forms a glycol or water soluble silicate, and can be selected from the group consisting of sodium, potassium, lithium, rubidium and tetraorganoammonium cations, m is from 1 to 4, n is from 1 to 4, and p is from 0 to 3, with the proviso that m+p=n.

Non-limiting examples of organic silicates include silicate esters include those having the formula Si(OR")$_4$ wherein R" is selected from the group consisting of C$_1$ to C$_{36}$ alkyl, aryl, alkoxyalkyl, alkoxyaryl, hydroxyalkoxy, and a combination thereof. Advantageously, a tetraalkylorthosilicate ester with C$_1$ to C$_{20}$ alkyl groups (e.g., tetramethylorthosilicate, tetraethylorthosilicate, and the like) can be used. The silicate ester can be present in the formulation in an amount of up to about 5 wt %, and advantageously about 0.01 to about 5 wt %, based on the total weight of the heat transfer fluid.

Polymers of the silicates, silicones, or siloxanes can also be used as corrosion inhibitors. They include phosphonate-silicate, sulfonate-silicate, carboxylate-silicate and siloxane-silicate copolymers generally used in the art in silicate-containing heat transfer compositions. These copolymers can be preformed or can be formed in situ upon combination of a water-soluble silicate and a water-soluble phosphonate, sulfonate, or siloxane in an aqueous solution at ambient temperature, i.e., an organosilicone compound. These copolymers are generally referred to as "siloxane-silicate" copolymers in that each contains silicon in addition to the phosphonate, sulfonate, carboxylate, etc., moiety. In one exemplary embodiment, the siloxane-silicate copolymers provide improved brazed metal corrosion inhibition over the use of simple metal silicates, since the siloxane-silicate copolymers substantially inhibit the gelation tendency of water soluble silicates at a pH of about 7 to about 11.

Other suitable silicones (or siloxane compounds) or siloxane-silicate copolymers which can be utilized herein include, but are not limited to, those described in U.S. Pat. Nos. 3,341,469; 3,337,496; 3,312,622; 3,248,329; 3,198,820; 3,203,969; 4,093,641; 4,287,077; 4,333,843; 4,352,742; 4,354,002; 4,362,644; 4,370,255; 4,629,602; 4,701,277; and 4,772,408; and also in U.S. Patent Publication No. 2006/0017044.

Non-limiting examples of carboxylates for use herein include saturated and unsaturated aliphatic, and aromatic mono-, di- and tricarboxylic acids, and salts and isomers thereof, and any combination thereof. Specifically, the carboxylates include C$_4$-C$_{25}$ mono- and di-carboxylic acids. Non-limiting examples of the foregoing include 2-ethyl hexanoic acid, neodecanoic acid, benzoic acid, p-toluic acid, p-ethyl benzoic acid, t-butylbenzoic acid, hydroxybenzoic acid, methoxy benzoic acid, dodecanedioic, undecanedioic acid and sebacic acid, and alkali and alkali earth metal, ammonium and amine salts thereof, amides thereof, isomers thereof, and combinations thereof. In one exemplary embodiment, the carboxylates include hydroxybenzoic acid, alkyl benzoic acid, alkoxybenzoic acid of the formula R$^4$O—C$_6$H$_4$—COOH wherein R$^4$ is a C$_1$-C$_5$ alkyl group, cinnamic acid, alkyl cinnamic acid, alkoxy cinnamic acid of the formula R$^5$—C$_6$H$_4$—CH=COOH wherein R$^5$ is C$_1$-C$_5$ alkyl group or alkoxy group, or combinations thereof.

The carboxylates can be present in an amount of about 0.01 to about 10 wt %, more specifically about 0.1 to about 8 wt %, even more specifically about 1 to about 5 wt %, based on the total weight of the heat transfer fluid.

In one exemplary embodiment, the corrosion inhibitor comprises about 1 to about 5 wt % of a carboxylate selected from $C_5$-$C_{24}$ aromatic and aliphatic, mono-, di- and tri carboxylic acids and carboxylic acid salts.

In another exemplary embodiment, the corrosion inhibitor comprises about 0.05 wt % to about 1.5 wt % of an azole compound, and about 0.2 wt % to about 5 wt % of a carboxylic acid selected from $C_6$-$C_{24}$ aliphatic and aromatic mono-, di-, and tri-carboxylic acids and carboxylic acid salts, based on the weight of the heat transfer fluid.

Non-limiting examples of tall oil fatty acids for use herein also include compounds derived therefrom, and are described in U.S. Pat. No. 5,292,480 and U.S. Pat. No. 6,391,257, the contents of which are incorporated herein by reference.

Specifically, non-limiting examples of tall oil fatty acids include maleated tall oil fatty acids and their salts such as TENAX 2010 having the formula (V):

(V)

wherein x+y=12, and reaction products of maleated tall oil fatty acids such as TENAX WS-5520 and WS-5560, OCD 447, and WS-3520, and maleated tall oil such as TENAX 2015, such as those available from MeadWestvaco, Charleston, S.C., USA. In addition, maleinized unsaturated fatty acids and certain copolymers of acrylate and styrene such as ALCOSPERSE 725 can also be used. Other examples include carboxylate-based polymers comprising suitable hydrophobic portions or polymerizable-acid graft polymer, such as EPML-483 polymer or the like. Combinations of the foregoing non-limiting examples can also be used.

The tall oil fatty acids can be present in an amount of up to about 20 wt %, more specifically about 0.02 to about 7 wt %, based on the total weight of the heat transfer fluid.

In certain embodiments, it can be advantageous if the heat transfer fluid comprises a tetraalkylorthosilicate ester. The tetraalkylorthosilicate ester comprises a $C_1$-$C_{20}$ alkyl group, non-limiting examples of which include tetramethylorthosilicate, tetraethylorthosilicate, and the like. The tetraalkylorthosilicate ester can be present in the heat transfer fluid in an amount up to about 5 wt %, based on the total weight of the heat transfer fluid.

The heat transfer fluids can also comprise additional additives such as colorants, antifoam agents, wetting agents, biocides, pH adjusting agents, buffering agents, bitterants, dispersants or combinations thereof in amounts of up to 10 wt %, based on the total weight of the heat transfer fluid.

In one embodiment, the heat transfer fluid comprises a liquid coolant, an oxy-anion of molybdenum, tungsten, vanadium, phosphorus, antimony, or a combination thereof, and a corrosion inhibitor, the liquid coolant consisting essentially of an alcohol.

In another embodiment, the heat transfer fluid comprises a liquid coolant comprising an alcohol and water, an oxy-anion of molybdenum, tungsten, vanadium, phosphorus, antimony, or a combination thereof, and a corrosion inhibitor.

In another embodiment, the heat transfer fluid comprises a liquid coolant, an oxy-anion of molybdenum, tungsten, vanadium, phosphorus, antimony, or a combination thereof, an azole compound, one or more $C_6$-$C_{24}$ aliphatic or aromatic mono, di, or tri-carboxylic acid or tri-carboxylic acid salt, an antifoam agent, and one or more optional pH adjusting or buffering agents.

Non-limiting examples of the optional pH adjusting or buffering agents for use in the heat transfer fluid include sodium hydroxide, potassium hydroxide, sodium borates, potassium borates, and the like.

In another embodiment, the heat transfer fluid comprises a liquid coolant, an oxy-anion of molybdenum, tungsten, vanadium, phosphorus, antimony, or a combination thereof, an azole compound, a silicate, a silicate stabilizing silicone, one or more pH adjusting or buffering agents, and antifoam agent.

In another embodiment, the heat transfer fluid comprises a liquid coolant, an oxy-anion of molybdenum, tungsten, vanadium, phosphorus, antimony, or a combination thereof, an azole compound, a silicate, a silicate stabilizing silicone, one or more pH adjusting or buffering agents, an antifoam agent, and a colorant.

In yet another embodiment, the heat transfer fluid comprises a liquid coolant, an oxy-anion of molybdenum, tungsten, vanadium, phosphorus, antimony, or a combination thereof, an azole compound, a silicate, a silicate stabilizing silicone, one or more pH adjusting or buffering agents, one or more $C_6$-$C_{24}$ aliphatic or aromatic mono, di, or tri-carboxylic acid or its water soluble salt, an antifoam agent, and a colorant.

The heat transfer fluid can be prepared by mixing the components together. Normally, the alcohol and water are advantageously mixed together first. The other components and additives are then added to the alcohol-water mixture by mixing and adequate stirring.

One embodiment is a method of preventing corrosion in a heat transfer system comprising a brazed aluminum component, and a heat transfer fluid in fluid communication with the brazed aluminum component. The method comprises contacting the heat transfer system with a heat transfer fluid comprising a liquid coolant, an oxy-anion of molybdenum, tungsten, vanadium, phosphorus, antimony, or a combination thereof, and a corrosion inhibitor.

The liquid coolant, the oxy-anion of molybdenum, tungsten, vanadium, phosphorus, or antimony, and the corrosion inhibitor include all the above, and can be used in the above amounts. The heat transfer fluid can also comprise additional additives such as the above additives, which can also be used in the above amounts.

One embodiment is a heat transfer fluid for use in a heat transfer system comprising a brazed aluminum component, the heat transfer fluid comprising a liquid coolant, an oxy-anion of molybdenum, tungsten, vanadium, phosphorus, antimony, or a combination thereof, and a corrosion inhibitor.

The liquid coolant, the oxy-anion of molybdenum, tungsten, vanadium, phosphorus, or antimony, and the corrosion inhibitor include all the above, and can be used in the above amounts. The heat transfer fluid can also comprise additional additives such as the above additives, which can also be used in the above amounts.

In one embodiment, the above disclosed heat transfer fluid can be used as an additive package. That is, an additive package comprising an oxy-anion of molybdenum, tungsten, vanadium, phosphorus, antimony, or a combination thereof, and a corrosion inhibitor, with or without a liquid coolant, can be used to treat another heat transfer fluid. The other heat transfer fluid can be any heat transfer fluid requiring increased corrosion protection such as a heat transfer fluid within a heat transfer system comprising brazed aluminum component, e.g., a pre-existing heat transfer fluid and/or coolant within an automotive vehicle, or a newly manufactured or purchased heat transfer fluid and/or coolant lacking adequate corrosion protection for brazed aluminum and/or brazed aluminum alloys.

In one embodiment, the additive package is free of liquid coolants. In this embodiment, the additive package comprises an oxy-anion of molybdenum, tungsten, vanadium, phosphorus, antimony, or a combination thereof, and a corrosion inhibitor. The oxy-anion of molybdenum, tungsten, vanadium, phosphorus, or antimony, and the corrosion inhibitor include all the above, and can be used in any suitable amount so that in the final mixture, the amounts are those described above.

The amount of oxy-anion of molybdenum, tungsten, vanadium, phosphorus, or antimony, and of the corrosion inhibitor can be easily determined by one with ordinary skill in the art. For example, if the additive package is to be used in a heat transfer system comprising a total of 2000 grams of heat transfer fluid composition, and if the desired amount of the oxy-anion of molybdenum, tungsten, vanadium, phosphorus, or antimony is about 0.01 to about 10 wt %, based on the total weight of the heat transfer fluid, then the desired amount of the oxy-anion of molybdenum, tungsten, vanadium, phosphorus, or antimony can be calculated as (amount of oxy-anion)/(amount of oxy-anion+2000 grams)×100=about 0.01 to about 10, resulting in the amount of oxy-anion in a total of 2000 grams of heat transfer fluid composition would be about 0.22 to about 222 grams.

The additive package can also comprise additional additives such as the above additives, which can also be used in amounts that when mixed with the heat transfer fluid in the heat transfer system, they result in the above amounts disclosed for the heat transfer system.

In general, the oxy-anion of molybdenum, tungsten, vanadium, phosphorus, antimony, or a combination thereof, can be present in an amount of about 1 to about 99 wt %, specifically about 10 to about 90 wt %, more specifically about 20 to about 80 wt %, more specifically about 30 to about 70 wt %, and even more specifically about 40 to about 60 wt %, based on the total weight of the additive package. In one exemplary embodiment, the oxy-anion is present in an amount of about 20 to about 60 wt %, based on the total weight of the additive package.

The corrosion inhibitors can be present in an amount of about 1 to about 99 wt %, specifically about 10 to about 90 wt %, more specifically about 20 to about 80 wt %, more specifically about 30 to about 70 wt %, and even more specifically about 40 to about 60 wt %, based on the total weight of the additive package. In one exemplary embodiment, the corrosion inhibitors are present in an amount of about 40 to about 80 wt %, based on the total weight of the additive package.

The additional additives generally used in heat transfer fluids such as the above disclosed colorants, antifoam agents, wetting agents, biocides, bitterants, dispersants or combinations thereof in amounts of up to 50 wt %, based on the total weight of the additive package.

The additive package can be used in any suitable form, such as solid, powder, gel, capsule, and the like, and can be an immediate release package or an extended release package.

In one exemplary embodiment, the additive package is used as a concentrated additive solution. The solvent for the concentrated additive solution can be any suitable solvent. Advantageously, the solvent can be any of the above described liquid coolants, or combinations thereof. For example, the additive package can be used as a concentrated solution of water, ethylene glycol, diethylene glycol, 1,2-propylene glycol, 1,3-propylene glycol, glycerol or a combination thereof.

When used as a concentrated additive solution, the additive package can be present in an amount of about 0.5 to about 99 percent by weight, based on the total weight of the concentrated additive solution. More specifically, the additive package can be present in an amount of about 1 to about 50 percent by weight, more specifically about 2 to about 40 percent by weight, and even more specifically about 3 to about 30 percent by weight, based on the total weight of the concentrated additive solution.

In one exemplary embodiment, the concentrated additive solution comprises the additive package in an amount of about 2 to about 30 percent by weight, based on the total weight of the concentrated additive solution.

The heat transfer system can be a variety of assemblies comprising brazed aluminum components. It will be understood that once the leached out halogen ions and flux residue components are in contact with the heat transfer fluid, they can have adverse effects on metals and metal alloys that are not themselves brazed.

The assemblies can comprise internal combustion engines and alternative power sources. Non-limiting examples of alternative power sources include batteries, fuel cells, solar cells or solar panels, photovoltaic cells, and internal combustion engines powered by the condensation of steam, natural gas, diesel, hydrogen, hybrid type, and/or the like. In one embodiment, alternative power sources include devices powered by internal combustion engines operating with a clean heat transfer system, that is, a heat transfer system that does not contribute to the concentration of ionic species in the heat transfer fluid. Such alternative power sources can be used alone or in combination, such as those employed in hybrid vehicles.

Assemblies comprising such alternative power sources include any article that can traditionally be powered by an internal combustion engine, such as automotive vehicles, boats, generators, lights, aircrafts and airplanes, trains or locomotives, military transport vehicles, stationary engines, and the like. The assemblies can also include additional systems or devices required for the proper utilization of the alternative power sources such as electric motors, DC/DC converters, DC/AC inverters, electric generators, and other power electronics and electrical devices, and the like.

The disclosed assemblies comprise a power source comprising a heat transfer system in thermal communication with the alternative power source and with the heat transfer fluid. In one embodiment, the heat transfer system comprises a circulation loop defining a flow path for the heat transfer fluid. In one embodiment, the heat transfer fluid is in direct contact with the brazed aluminum component.

Figure 1:
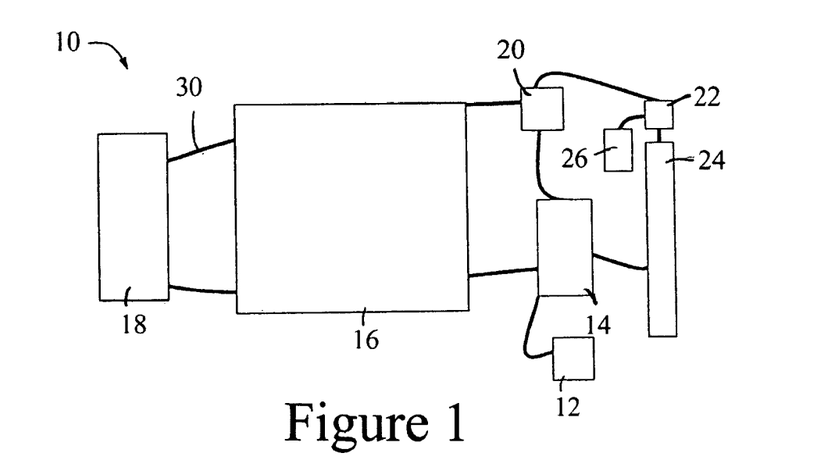
FIG. 1 is a schematic diagram of one embodiment of the heat transfer system.

In an exemplary embodiment referred to in FIG. 1, the power source is an internal combustion engine, and the heat transfer system comprises brazed aluminum components. It will be understood that while FIG. 1 refers to an exemplary embodiment wherein the heat transfer system comprises brazed aluminum components, it can further comprise other metals or alloys such as magnesium, copper, carbon steel, brass, or the like. A combination of the metals or alloys can also be used.

Thus, referring now to FIG. 1, an exemplary heat transfer system 10 comprises a heat transfer fluid reservoir 12, a pump 14, an engine 16, a heater core 18, a thermostat 20, a radiator cap 22, a radiator 24 and an overflow tank 26. The heat transfer system can further comprise conduits such as pipe 30, valves (not shown), sensors (not shown), pumps and other components. Each component of the heat transfer system 10 can comprise brazed aluminum and/or aluminum alloys. In one exemplary embodiment, at least one of the components of the heat transfer system 10 comprises brazed aluminum and/or aluminum alloys. In another exemplary embodiment, each of the pump 14, the engine 16, the heater core 18, the thermostat 20, the radiator cap 22, the radiator 24, and the overflow tank 26 comprise brazed aluminum and/or aluminum alloys. In another exemplary embodiment, one or more components comprise brazed aluminum and/or aluminum alloys while one or more other components do not comprise brazed aluminum.

The reservoir 12 maintains the heat transfer fluid in an environment free from undesirable contaminants when the fluid is not circulating. In one embodiment, reservoir 12 comprises plastic.

The pump 14 drives the fluid through the heat transfer system 10. Specifically, pump 14 routes fluid from the reservoir, through an engine block of the engine 16, that is, through a first set of interior passages of the engine that are disposed proximate the engine cylinder, through heater core 18, through a second set of interior passages of the engine block, and to the thermostat 20. Depending on the position of the thermostat 20, the fluid is then routed through either the radiator cap 22, the radiator 24, then to the pump 14, or directly to the pump 14. The pump 14 can be a centrifugal pump driven by a belt connected to a crankshaft of the engine 16. The pump 14 pumps heat transfer fluid through the heat transfer system 10 when the engine 16 is operating. The pump 14 can comprise a rotating component comprising an impeller and a shaft. The pump 14 can further comprise a stationary component comprising a casing, a casing cover, and bearings. In an exemplary embodiment both the rotating component of the pump and the casing component of the pump comprise brazed aluminum and/or aluminum alloys. In another exemplary embodiments only the rotating component, the casing component, or subcomponents of the rotating component and casing component comprise brazed aluminum and/or aluminum alloys.

The engine 16 comprises the engine block, cylinders, cylinder connecting rods, and a crankshaft. The engine block comprises internal passageways disposed therethrough. The internal passageway can be cast or machined in the engine block. The heat transfer fluid can be routed through the internal passageways of the engine to transfer heat from the engine. These passageways direct the heat transfer so that the fluid can transfer heat away from the engine to optimize engine performance.

In an exemplary embodiment the metal engine components comprise aluminum and/or aluminum alloys, brazed aluminum and/or aluminum alloys, or a combination thereof. Specifically, the engine block, the cylinders, the cylinder connecting rods, and the crankshaft comprise aluminum and/or aluminum alloys, brazed aluminum and/or aluminum alloys, or a combination thereof. In another exemplary embodiment, certain engine components comprise aluminum and/or aluminum alloys, brazed aluminum and/or aluminum alloys, or a combination thereof, while other engine components do not comprise aluminum and/or aluminum alloys, brazed aluminum and/or aluminum alloys, or a combination thereof. For example, the engine block can comprise aluminum and/or aluminum alloys, brazed aluminum and/or aluminum alloys, or a combination thereof, while the cylinder, cylinder connecting rods, and the crankshaft can comprise steel.

The heater core 18 cools the heat transfer fluid while heating the vehicle interior. The heater core 18 comprises a series of thin flattened tubes having a high interior surface area and exterior surface area such that heat can be effectively transferred away from the heat transfer fluid. In an exemplary embodiment, the heater core 18 comprises brazed aluminum and/or aluminum alloy tubes. In another exemplary embodiment the heating core comprises tubes joined together by other joining methods or the heating core can be cast as a single unit. Air can be forced past the heater core to increase the cooling rate of the heat transfer fluid.

The thermostat 20 measures the temperature indicative of the heat transfer fluid temperature and selectively routes the heat transfer fluid to the radiator or to the pump. Thermostat 20 routes the heat transfer fluid to the radiator when the temperature of the heat transfer fluid is greater than or equal to the selected temperature and to the pump when the temperature of the heat transfer fluid is less than the selected temperature. The thermostat has an inlet portion, a radiator outlet portion, a radiator bypass outlet portion, and a valve portion. A single housing member can define the inlet portion, the radiator outlet portion, and the radiator bypass outlet portion. The valve portion is disposed within the single housing member and provides selective communication between the inlet portion and both the radiator outlet portion and the radiator bypass outlet portion. When the valve is in a closed position, the thermostat routes the heat transfer fluid directly to the pump. When the valve is in the open position, the thermostat routes the heat transfer fluid through the radiator. In an exemplary embodiment, the thermostat valve portion and the thermostat housing member comprise brazed aluminum and/or aluminum alloys. In another exemplary embodiment, only the housing or only the valve portion comprises brazed aluminum and/or aluminum alloys.

The radiator cap 22 seals the heat transfer system and maintains the heat transfer fluid at a selected pressure to prevent the heat transfer fluid from boiling. In an exemplary embodiment, the radiator cap 22 comprises brazed aluminum and/or aluminum alloys.

The radiator 24 cools the heat transfer fluid. The radiator 24 can comprise a series of thin flattened tubes having a high interior surface area and exterior surface area such that heat can be effectively transferred from the heat transfer fluid. In an exemplary embodiment, the radiator 24 comprises brazed aluminum and/or aluminum alloy tubes. In another exemplary embodiment the radiator can comprise tubes joined together by other joining methods or case as a single unit. Air can be forced past the radiator to increasing the cooling rate of the heat transfer fluid.

Figure 2:
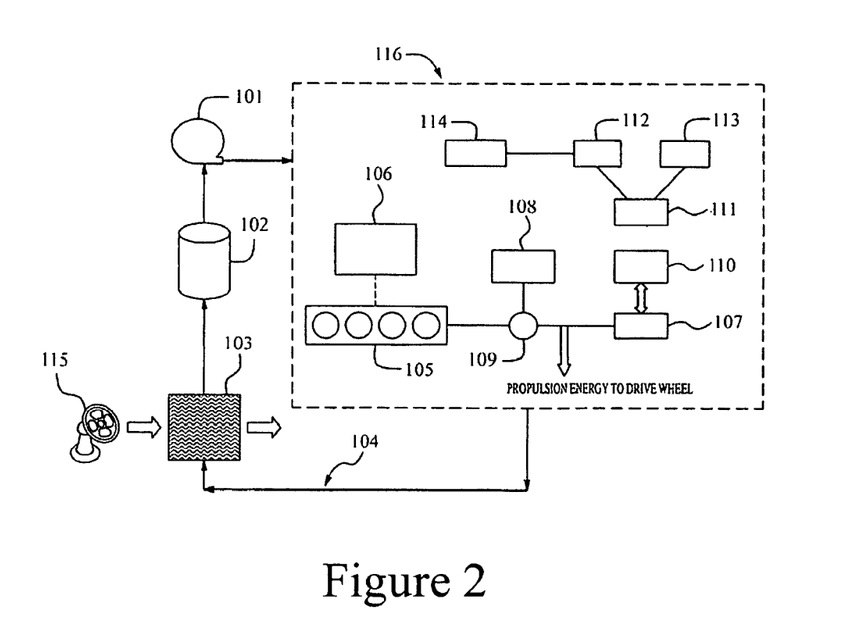
FIG. 2 is a schematic diagram of another embodiment of the heat transfer system.

In an another exemplary embodiment referred to in FIG. 2, an assembly comprises a power source which can be an internal combustion engine, or advantageously, an alternative power source, specifically a solar cell or fuel cell. The heat transfer system comprises brazed aluminum and/or aluminum alloys. The assembly can also comprise a regenerative braking system. It will be understood that while FIG. 2 refers to an exemplary embodiment wherein the heat transfer system comprises brazed aluminum and/or aluminum alloys, it can comprise any other metal or metal alloy, such as magnesium, copper, carbon steel, brass, or the like. A combination of the metals or alloys can also be used.

Thus, referring now to FIG. 2, an exemplary heat transfer system 116 comprises an internal combustion engine 105, or fuel cells 105 or solar cells 105 as the primary power source 107. It also comprises a rechargeable secondary battery 112 or an optional ultra-capacitor 113 that can be charged via the assembly's regenerative braking system. The battery 112 and/or the ultra-capacitor 113 can act as secondary power sources. The assembly can further comprise power electronic devices, such as DC/DC converters 110, DC/AC inverters 110, generators 108, power splitting devices 109, and/or voltage boost converters 111, and the like. In addition, the assembly can contain fuel cell or solar cell "balance of plant" subsystems 106. These can be air compressors, pumps, power regulators, and the like. The assembly also comprises HAVC systems 114, such as, air-conditioning system for the climate control of assembly interior space. The heat transfer system 116 further comprises a pump 101, heat transfer fluid flow path 104, heat transfer fluid tank 102, and a radiator or heat exchanger 103, and a fan 115. The fan can be substituted by an external cooling source, such as a different (or isolated) cooling system with its own cooling media.

In one embodiment, the alternative power source is a fuel cell. The fuel cell is in thermal communication with the heat transfer systems and fluids. The fuel cell comprises brazed aluminum and/or aluminum alloys.

The heat transfer fluid can be used in a number of different types of fuel cells comprising an electrode assembly comprising an anode, a cathode, and an electrolyte, and a heat transfer fluid in thermal communication with the electrode assembly or fuel cell. In one embodiment the heat transfer fluid can be contained or flow in channel or flow path defined by a circulation loop or heat transfer fluid flow channel in thermal communication with the fuel cell.

Non-limiting examples of fuel cells include PEM (Proton Exchange Membrane or Polymer Electrolyte Membrane) fuel cells, AFC (alkaline fuel cell), PAFC (phosphoric acid fuel cell), MCFC (molten carbonate fuel cell), SOFC (solid oxide fuel cell), and the like. In one exemplary embodiment, the heat transfer fluid is used in PEM and AFC fuel cells.

The invention is further illustrated by the following non-limiting examples.

Organic Acid Technology (OAT) coolants were used in the test samples. Test samples were prepared by mixing base coolants with deionized water to produce a coolant concentration of 25 or 50 percent by volume, as shown in Tables 2 and 4. In some test examples, 100 ppm of chloride (introduced as sodium salt) was also added in the test coolants, as shown in Tables 2, and 4.

Examples 1-7

Sheets of aluminum alloy were prepared with fluxing agents. The fluxing agent used was potassium fluoroaluminate flux, and which can leach out fluoride ions. The concentrations of the applied fluxing agent were either a regular load or a double load. The amount of fluxing agent applied was determined by subtracting the weight of the aluminum sheet prior to brazing from the final weight of the brazed aluminum sheet. The sheets were then cut into 2×2 inch sections.

The 2×2 inch samples that did not have any apparent scratches were used as electrodes. In some tests, the electrodes were polished using 600 grit silicon carbide sand paper. The electrodes were cleaned with acetone and air-dried prior to immersion in the test solution for electrochemical tests.

A Ford Laboratory Test Method (FLTM) BL-105-1 "A Rapid Method to Predict the Effectiveness of Inhibited Coolants in Aluminum Heat Exchangers" test cell was used to conduct the tests for the sample. The FLTM BL-105-01 test cell gives an exposed aluminum surface area of 8.04 cm$^2$. The volume of solution used in the test was about 45 ml. A graphite rod was used as counter electrode. A silver/silver chloride (3 M KCl) reference electrode placed in a Luggin probe was used as the reference electrode.

The heat transfer fluid was added to the cell and the aluminum was heated until the fluid boiled. The fluid was boiled for one hour, while maintaining the fluid volume by additions of deionized water (if required), and then the temperature of the fluid was reduced to 70° C. Once the solution in the cell had reached the temperature of 70° C., the sample was connected to a potentiostat as the working electrode. The open circuit potential was measured for 5 minutes and a potentiodynamic polarization scan started at −20 mV vs. the open circuit potential. The potential was scanned at a rate of 2 mVs$^{-1}$ in the anodic (positive) direction until pitting was observed or the potential reached 2V more anodic than the open circuit potential, whichever happened first. The current was recorded as a function of potential. At the end of the test, samples of before and after test fluid were submitted for analysis of fluoride ions.

Nine base coolants (A through I) were prepared, their composition is illustrated in Table 1 below. All units are in wt %.

TABLE 1

|  | A | B | C | D | E | F | G | H | I |
|---|---|---|---|---|---|---|---|---|---|
| Ethylene glycol | >94 | >94 | >94 | >94 | >94 | >94 | >94 | >94 | >94 |
| Tolyltriazole | 0.1-0.3 | 0.1-0.3 | 0.1-0.3 | 0.1-0.3 | 0.2-0.5 | 0.1-0.3 | 0.1-0.3 | 0 | 0.1-0.3 |
| Nitrate | 0 | 0 | 0 | 0.2-0.5 | 0 | 0.2-0.5 | 0 | 0.1-0.4 | 0.2-0.5 |
| Nitrite | 0 | 0 | 0 | 0 | 0 | 0 | 0 | 0.1-0.4 | 0 |
| Molybdate | 0 | 0 | 0 | 0 | 0 | 0 | 0 | 0 | 0.04-0.1 |
| Borax | 0 | 0 | 0 | 0 | 0 | 0 | 0 | 0.5-2.5 | 0.1-2.0 |
| Phosphoric acid | 0 | 0 | 0 | 0 | 0 | 0 | 0 | 0 | 0.1-0.5 |
| MBT | 0 | 0 | 0 | 0 | 0 | 0 | 0 | 0 | <0.3 |
| BZT | 0 | 0 | 0 | 0 | 0 | 0 | 0 | 0.05-0.15 | 0 |
| Silicate | 0 | 0 | 0 | 0 | 0 | 0 | 0 | 0.1-0.2 | 0.1-0.5 |
| 2-EH acid | 1.7-3.5 | 1.7-3.5 | 1.7-3.5 | 0 | 1.7-3.0 | 0 | 1.7-3.5 | 0 | 0 |
| Sebacic acid | 0 | 0 | 0.1-0.6 | 1.0-3.0 | 0 | 1.0-3.5 | 0.1-0.4 | 0 | 0 |
| Neodecanoic acid | 0 | 0.1-1.5 | 0 | 0 | 0.1-1.0 | 0 | 0 | 0 | 0 |
| Benzoic acid | 0 | 0 | 0 | 0 | 0 | 0 | 0 | 1.0-3.0 | 0 |
| NaOH/KOH | 0.4-2.0 | 0.4-2.0 | 0.4-2.0 | 0.4-2.0 | 0.4-2.0 | 0.4-2.0 | 0.4-2.0 | 0.4-2.0 | 0.4-2.0 |

Table 2 illustrates the compositions of the test coolants used. Table 3 illustrates the amount of fluoride ion leached out from residual fluxing agents used for brazing aluminum. In Table 3, the test results were obtained on brazed aluminum used where the aluminum was brazed using a regular load of the fluxing agent. En refers to inventive examples where n is the example number, CEn refers to comparative examples where n is the example number. OCD-448 and OCD-447 are respectively a potassium salt of a diethylene glycol ester of a maleated tall oily fatty acid and a potassium salt of an ethylene glycol ester of a maleated tall oily fatty acid, available from MeadWestvaco of Charleston, S.C.

TABLE 2

| Coolant 1 | 25 vol % coolant B, 100 ppm Cl⁻ |
| Coolant 2 | 25 vol % coolant B, 100 ppm Cl⁻, 0.3 wt % OCD-447 |
| Coolant 3 | 25 vol % coolant B, 100 ppm Cl⁻, 0.1 wt % OCD-447 |
| Coolant 4 | 25 vol % coolant B, 100 ppm Cl⁻, 0.3 wt % OCD-448 |
| Coolant 5 | 25 vol % low silicate and carboxylic acid hybrid coolant or coolant H, 100 ppm Cl⁻ | required, NaOH or KOH was used to maintain the pH at about 8.1 to about 8.8 before immersion of the brazed aluminum test sample.

Table 4 illustrates the compositions of the coolants used. Table 5 illustrates the amount of fluoride ion leached out from residual fluxing agents, and the mass loss of the samples.

TABLE 4

| Coolant 7 | 50 vol % coolant B |
| Coolant 8 | 50 vol % coolant B + 0.25 wt % $Na_2MoO_4$ (41.1% aqueous solution) |
| Coolant 9 | 50 vol % coolant B + 0.25 wt % $H_3PO_4$ (75% aqueous solution) |
| Coolant 10 | 50 vol % coolant B |
| Coolant 11 | 50 vol % coolant B + 100 ppm Cl⁻ |
| Coolant 12 | 50 vol % coolant B + 100 ppm Cl⁻ + 0.3 wt % OCD-448 |
| Coolant 13 | 50 vol % coolant B + 100 ppm Cl⁻ + 0.4 wt % Alcosperse 725 |
| Coolant 14 | 50 vol % coolant G + 100 ppm Cl⁻ |
| Coolant 15 | 50 vol % coolant B + 100 ppm Cl⁻ + 0.3 wt % Tenax 2010 |
| Coolant 16 | 50 vol % coolant D + 100 ppm Cl⁻ |
| Coolant 17 | 50 vol % coolant A + 420 mg/L $Na_2MoO_4$ |
| Coolant 18 | 50 vol % coolant C |
| Coolant 19 | 50 vol % low silicate and carboxylic acid hybrid coolant, or coolant H |
| Coolant 20 | 50 vol % coolant B + 100 ppm Cl⁻ + 0.3 wt % OCD-448 |
| Coolant 21 | 50 vol % coolant D + 1 wt % sebacic acid |
| Coolant 22 | 50 vol % coolant E + 0.5 wt % $H_3PO_4$ (75% aqueous solution) + 0.8 wt % $Na_2MoO_4$ (41.1% aqueous solution) + 0.05 wt % Polyacrylamide (Mw = 3400) |
| Coolant 23 | 50 vol % coolant F |
| Coolant 24 | 50 vol % coolant F + 0.25 wt % $H_3PO_4$ (75% aqueous solution) |
| Coolant 25 | 50 vol % coolant F + 0.5 wt % $H_3PO_4$ (75% aqueous solution) |
| Coolant 26 | 50 vol % coolant F + 0.3 wt % Tenax WS 5520 |
| Coolant 27 | 50 vol % coolant F + 0.25 wt % $H_3PO_4$ (75% aqueous solution) + 0.25 wt % $Na_2MoO_4$ (41.1% aqueous solution) |

TABLE 2-continued

| Coolant 6 | 25 vol % high silicate coolant or coolant I, 100 ppm Cl⁻ |

TABLE 3

|  | Coolant | Fluoride, mg/L | Observation |
| --- | --- | --- | --- |
| CE1 | Coolant 1 | 56 | 90% surface area was attacked |
| CE2 | Coolant 1** | 0 | Surface (AA3003) showed minimal attack |
| CE3 | Coolant 2 | 7 | Surface showed very minor attack |
| CE4 | Coolant 3 | 16 | Surface showed minor attack, particularly under o-ring crevice |
| CE5 | Coolant 4 | <5 | Surface showed no noticeable attack |
| CE6 | Coolant 5 | 113 | Surface attacked intensively |
| CE7 | Coolant 6 | 26 | Surface showed isolated localized attack |

**The aluminum was not brazed in this sample

It can be seen from Table 2 that the cooling systems which comprise brazed aluminum release fluoride ions into the coolant solutions under vehicle operating conditions. High fluoride concentrations can be observed in some OAT coolants and low silicate and carboxylate hybrid coolants.

Examples 8-29

The test coolant was added to the cell and the flux residues covered brazed aluminum samples were heated until the solution reached 80° C. and were maintained at this temperature for 6 hours. At the end of the test, the mass loss of the brazed aluminum samples was determined after drying in a 60° C. oven overnight. Samples of the test fluid before and after the test were analyzed for fluoride ions. In this test, no electrochemical measurement was conducted on the sample. When

TABLE 5

|  | Coolant | Fluoride, mg/L | Amount of Flux | Mass Loss, mg |
| --- | --- | --- | --- | --- |
| CE8* | Coolant 7 | 67 | regular | 2.4 |
| E9* | Coolant 8 | 33 | regular | 2.6 |
| E10* | Coolant 9 | 24 | regular | 1.0 |
| CE11 | Coolant 10 | 37 | double | 5.9 |
| CE12 | Coolant 11 | 71 | double | 6.4 |
| CE13 | Coolant 12 | 3 | double | 0.8 |
| CE14 | Coolant 13 | 52 | double | 7.6 |
| CE15 | Coolant 14 | 47 | double | 4.9 |
| CE16 | Coolant 15 | <5 | double | 0.6 |
| CE17 | Coolant 16 | 30 | double | 5.4 |
| E18* | Coolant 17 | 28 | double | 3.8 |
| CE19* | Coolant 7 | 36 | double | 3.0 |
| CE20* | Coolant 18 | 41 | double | 3.1 |
| CE21* | Coolant 19 | 45 | double | 1.4 |
| CE22* | Coolant 20 | 13 | double | 0.4 |
| CE23* | Coolant 21 | 25 | double | 2.9 |
| E24* | Coolant 22 | 15 | double | 2.0 |
| CE25* | Coolant 23 | 32 | regular | 2.6 |
| E26* | Coolant 24 | 14 | regular | 0.4 |
| E27* | Coolant 25 | 26 | regular | 0.4 |
| CE28* | Coolant 26 | 14 | regular | 0.1 |
| E29* | Coolant 27 | 6 | regular | 0.6 |

*These results were obtained using a brazed aluminum test sample with an exposed surface area of 2.54 cm² and a solution volume of 15 ml.

It can be seen from Table 5 that the cooling systems that comprise brazed aluminum release fluoride ions into the coolant solutions under vehicle operating conditions. High fluoride concentrations can be observed in some OAT coolants and low silicate and carboxylate hybrid coolants. However, coolants that comprise oxy-anions of molybdenum, tungsten, vanadium, phosphorus, or antimony, exhibit a substantially reduced concentration of the fluoride ion. Also, the sample mass loss is reduced when they are used. Synergistic effect was observed when the phosphate ions and a second oxy-anions, e.g., oxy-anion of molybdenum in E29, were present together in the coolant solution, see examples E9, E26, E27 and E29.

Examples 30-32

Aqueous solution of 40% (w/v) KF from Spectrum Chemical Mfg. Corp. was used as the source of fluoride. Other components of the test solution were sodium chloride (ACS grade) and commercial products supplied by the producers.

Cast Aluminum samples were cut from an engine block coolant flow channel and machined to a metal plate with a dimension suitable for use in accordance with General Motors Engineering Standard GM 9066-P (issued in November 1981)—"Electrochemical Test for Evaluating Ethylene Glycol Engine Coolants for Corrosion Inhibition at Aluminum Heat-Rejecting Surface". The samples were polished using 600 grit silicon carbide sand paper, cleaned with acetone, and air dried before immersion into the test solution.

The samples were tested according to GM Engineering Standard 9066-P, however, the immersion time was modified according to Table 6. After the completion of the linear polarization resistance (LPR) measurements, a potentiodynamic polarization scan using a scan rate of 2 millivolts per second (mV/s) in the anodic direction until reaching about 5 V versus Ag/AgCl (3M KCl) was conducted. The results obtained from the polarization scan were used to determine the corrosion rate using the Tafel extrapolation method. A Stern-Geary coefficient of 49.90 mV was used to convert polarization resistance to LPR corrosion rate. Corrosion rates were reported in milliinch per year and micrometers per year (mpy/$\mu m \cdot y^{-1}$). The surface temperature of the electrode was 137.0±4° C. The coolant used in CE30 was a 50 vol % deionized water solution of the above described coolant B. The coolant used in E31 was a 50 vol % deionized water solution of the above described coolant A, having a concentration of 420 mg/L $Na_2MoO_4$ and 200 ppm fluoride ion. The coolant used in E32 was a 50 vol % deionized water solution of the above described coolant B, having 0.135 wt % potassium antimonyl tartrate and 200 ppm fluoride ion.

Table 6 illustrates the results of the polarization resistance tests.

TABLE 6

| | Immersion time (hours) | E-corr (V/AgAgCl) | LPR corrosion rate (mpy/$\mu m \cdot y^{-1}$) | Tafel corrosion rate (mpy/$\mu m \cdot y^{-1}$) |
|---|---|---|---|---|
| CE30 | 6.0 | −0.821 | 18.01/460 | — |
| | 28.0 | −0.821 | 11.75/300 | — |
| | 28.2 | −0.823 | — | 13.15/330 |
| E31 | 6.0 | −0.715 | 0.89/22 | — |
| | 28.0 | −0.740 | 0.74/19 | — |
| | 28.2 | −0.743 | — | 0.42/10 |
| E32 | 6.0 | −0.751 | 8.62/220 | — |
| | 28.0 | −0.720 | 6.34/160 | — |
| | 28.2 | −0.724 | — | 4.73/120 |

It can be seen from Table 6 that the presence of fluoride ion, such as fluoride ion that can be leached into the coolant from brazed aluminum, can lead to a substantial increase in the corrosion of the aluminum metal parts. However, the addition of an oxy-anion of molybdenum and/or antimony is effective at substantially reducing the corrosion rate of the aluminum and at reducing or eliminating the damaging effects of the fluoride ion.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety unless otherwise indicated. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Further, it is understood that disclosing a range is specifically disclosing all ranges formed from any pair of any upper range limit and any lower range limit within this range, regardless of whether ranges are separately disclosed. It is not intended that the scope of the invention be limited to the specific values recited when defining a range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). All embodiments are combinable except where the teachings with regard to two embodiments are contradictory.

"Heat transfer fluid" as used herein refers to a fluid or liquid that is capable of transferring and/or dissipating a quantity of thermal energy from a first point to a second point.

Certain compounds are described herein using a general formula that includes variables, e.g., $R^1$, $R^2$, X, and the like. Unless otherwise specified, each variable within such a formula is defined independently of other variables.

The term "substituted" as used herein refers to the replacement of any one or more hydrogen atoms on the designated atom or group with a selection from the indicated group, provided that the designated atom's normal valence is not exceeded.

As used herein, the term "alkyl" includes both branched and straight chain saturated aliphatic hydrocarbon groups, having the specified number of carbon atoms. The term $C_x$-$C_y$ alkyl as used herein indicates an alkyl group having from x to y carbon atoms. Examples of alkyl include, but are not limited to, methyl, ethyl, n-propyl, isopropyl, n-butyl, 3-methylbutyl, t-butyl, n-pentyl, and sec-pentyl.

"Alternative power sources" as used herein refer to power source technologies that provide improvements in energy efficiency, environmental concerns, waste production, and management issues, natural resource management, and the like.

What is claimed is:

1. An additive package comprising:
   at least two different oxy-anions, wherein each of the at least two different oxy-anions is independently selected from the group consisting of an oxy-anion of molybdenum, tungsten, vanadium, phosphorous, antimony, and a combination thereof;

a corrosion inhibitor selected from the group consisting of azole-based corrosion inhibitors, siloxane-based corrosion inhibitors, colloidal silica, carboxylates, tall oil fatty acids, borates, nitrates, nitrites, alkali metal salts thereof, alkaline earth metal salts thereof, ammonium salts thereof, amine salts thereof, and combinations thereof; and optionally a liquid coolant;

wherein the additive package is a concentrated additive solution.

2. The additive package of claim 1, wherein the additive package is free of liquid coolant.

3. The additive package of claim 1 further comprising an additive selected from the group consisting of colorants, antifoam agents, wetting agents, biocides, pH adjusting agents, buffering agents, bitterants, dispersants, phosphonates, and combinations thereof.

4. The additive package of claim 3, wherein the additive comprises up to 50 wt % of the total weight of the additive package.

5. The additive package of claim 1, wherein the liquid coolant comprises an alcohol.

6. The additive package of claim 5, wherein the liquid coolant further comprises water.

7. The additive package of claim 1, wherein the additive package is a powder, a gel, or a capsule.

8. The additive package of claim 1, wherein the additive package is an immediate release package.

9. The additive package of claim 1, wherein the additive package is an extended release package.

10. The additive package of claim 1, wherein the at least two different oxy-anions comprise from about 1 wt % to about 99 wt % of the total weight of the additive package.

11. The additive package of claim 1, wherein the at least two different oxy-anions comprise from about 40 wt % to about 60 wt % of the total weight of the additive package.

12. The additive package of claim 1, wherein the corrosion inhibitor comprises from about 1 wt % to about 99 wt % of the total weight of the additive package.

13. The additive package of claim 1, wherein the corrosion inhibitor comprises from about 40 wt % to about 60 wt % of the total weight of the additive package.

14. The additive package of claim 1, wherein the additive package comprises an oxy-anion of phosphorous and an oxy-anion of molybdenum, tungsten, vanadium, antimony, or a combination thereof.

15. A method of providing corrosion inhibition to a heat transfer fluid, the method comprising:

a) adding an additive package to the heat transfer fluid, the additive package comprising i) at least two different oxy-anions, wherein each of the at least two different oxy-anions is independently selected from the group consisting of an oxy-anion of molybdenum, tungsten, vanadium, phosphorous, antimony, and a combination thereof; ii) a corrosion inhibitor selected from the group consisting of azole-based corrosion inhibitors, siloxane-based corrosion inhibitors, colloidal silica, carboxylates, tall oil fatty acids, borates, nitrates, nitrites, alkali metal salts thereof, alkaline earth metal salts thereof, ammonium salts thereof, amine salts thereof, and combinations thereof; and iii) optionally a liquid coolant, wherein the additive package is a concentrated additive solution.

16. The method of claim 15, wherein the heat transfer fluid requires increased corrosion protection.

17. The method of claim 16, wherein the additive package is added to the heat transfer fluid within an automotive vehicle.

18. The method of claim 17, wherein the additive package is added to the heat transfer fluid in a heat transfer system within the automotive vehicle.

19. The method of claim 18, wherein the heat transfer system comprises a brazed aluminum component.

20. The method of claim 16, wherein the heat transfer fluid is a heat transfer fluid or coolant lacking adequate corrosion protection for brazed aluminum or brazed aluminum alloys.

21. An additive package comprising:

at least two different oxy-anions, wherein each of the at least two different oxy-anions is independently selected from the group consisting of an oxy-anion of molybdenum, tungsten, vanadium, phosphorous, antimony, and a combination thereof; and a corrosion inhibitor selected from the group consisting of azole-based corrosion inhibitors, siloxane-based corrosion inhibitors, colloidal silica, carboxylates, tall oil fatty acids, borates, nitrates, nitrites, alkali metal salts thereof, alkaline earth metal salts thereof, ammonium salts thereof, amine salts thereof, and combinations thereof;

wherein the oxy-anion comprises from about 10% to about 90% by weight of the additive package.

22. The additive package of claim 21, wherein the additive package comprises an oxy-anion of phosphorous and an oxy-anion of molybdenum, tungsten, vanadium, antimony, or a combination thereof.

23. The additive package of claim 21, wherein the additive package comprises an oxy-anion of phosphorous and an oxy-anion of molybdenum.

* * * * *